Figure 1:
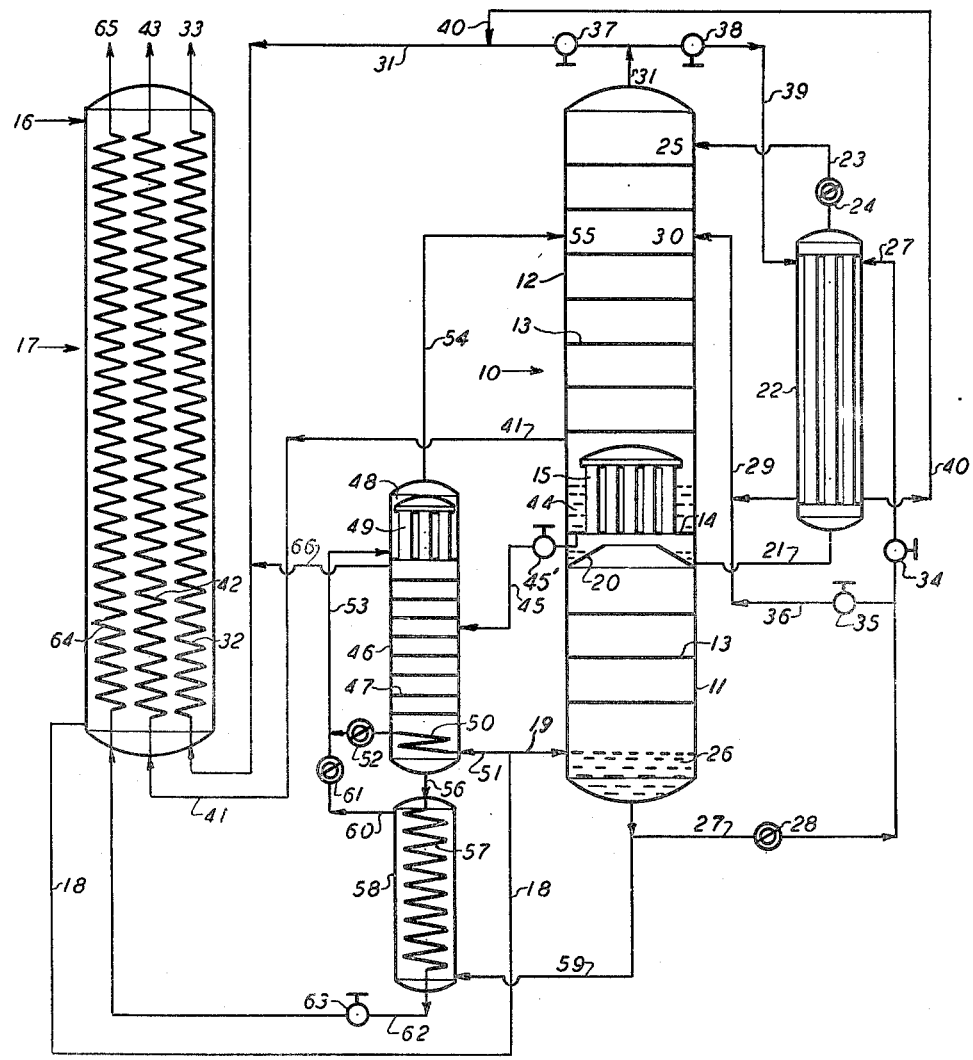

Sept. 7, 1954          C. J. SCHILLING                2,688,238
                         GAS SEPARATION
Filed May 26, 1949                                2 Sheets-Sheet 1

INVENTOR
CLARENCE J. SCHILLING
ATTORNEY

Sept. 7, 1954      C. J. SCHILLING      2,688,238

GAS SEPARATION

Filed May 26, 1949      2 Sheets-Sheet 2

INVENTOR
CLARENCE J. SCHILLING
BY

UNITED STATES PATENT OFFICE 2,688,238

GAS SEPARATION

Clarence J. Schilling, Allentown, Pa., assignor to Air Products, Incorporated, a corporation of Michigan Application May 26, 1949, Serial No. 95,551

18 Claims. (Cl. 62—122)

This invention relates to an air fractionating cycle and apparatus, and more particularly to a method and apparatus for fractionating air providing for the continuous production of pure oxygen from a tonnage plant and for the continuous removal of explosive substances from the column.

This application is a continuation-in-part of my application Serial No. 755,286, filed June 18, 1947, now Patent No. 2,626,510, dated Jan. 27, 1953.

At the present time, there is much interest in oxygen producing plants of very large capacity, in connection with blast furnace and steel plant operations, synthesis of liquid fuel from gaseous hydrocarbons and similar chemical manufacturing operations. These plants may be designed to produce oxygen at extremely low cost, provided they are not required to produce oxygen of the highest purity. Most of these large scale uses are satisfied with an oxygen of from 95% to 97% purity and the cost of the product rises very rapidly as the nitrogen and argon content is carried below about 3%.

This invention has as an object to provide a method and means for the manufacture of commercial oxygen on a large scale by the fractionation of air while providing for the continuous production of a pure oxygen product along with the large scale production of the commercial oxygen and at the same time to provide for the continuous removal of explosive substances from the fractionating column to prevent their accumulation therein with the attendant risk of explosion.

Other objects will appear hereinafter.

Air fractionating columns producing large quantities of oxygen in gaseous form accumulate various hydrocarbons, including acetylene, which are present in the air supply and are not removed in the primary interchanger. These substances appear as fine crystals or grains in the oxygen or oxygen-containing liquids collecting in the lower end of a single-stage column and in the lower end of the low pressure section of a two-stage column. These hydrocarbons occur in too small a proportion to be dangerous so long as they are in the form of vapor intermixed with the gaseous oxygen product, but if permitted to accumulate in solid form they are capable of detonating with disastrous results. Such accumulation cannot occur in the pool of crude oxygen in the lower end of the high pressure section of a double column as this liquid is continuously transferred into the low pressure section, nor does it occur in any column in which the pure oxygen product is withdrawn in liquid form (assuming that the withdrawal is from a point close to the bottom of the pool), but in operations in which the oxygen product is withdrawn in the form of vapor the risk of explosion is serious enough to warrant every precaution to avoid it.

It is customary to flush out these impurities occasionally, but this practice is undesirable as causing wastage of oxygen. It is also undesirable as requiring attention at frequent intervals, any neglect of the flushing step being attended by serious risk.

It has also been proposed in the prior art to cause the solidification of these impurities outside the fractionating column, concentrate them in a small bulk of liquid and remove them in the solid form by filtration. This proposal would appear merely to transfer the risk of detonation to a smaller and less expensive piece of apparatus rather than to avoid it.

The present application proposes to avoid explosion risk completely by continuously withdrawing from the liquid oxygen reservoir of the column a small stream of liquid containing the explosive solids in suspension, subjecting this liquid to a secondary stripping step which may be a fractionation or a rectification step in which its content of nitrogen and argon is substantially completely removed, and continuously vaporizing the pure oxygen and its content of hydrocarbons. The secondary fractionation step comprises separating virtually all of the nitrogen and argon as a gaseous stream at the top of the column from the pure liquid oxygen stream containing the hydrocarbons which collects at the bottom of the column. The gaseous stream is combined with the nitrogen product from the air fractionating column. As a modified procedure, the stripping step can be a fractionation wherein virtually all of the nitrogen and argon, including an appreciable amount of oxygen, are separated as a gaseous stream from the pure liquid oxygen containing the hydrocarbons. The gaseous stream is combined with the oxygen product from the air fractionating column.

This manipulation has material advantages: in continuously scavenging the main column without attention, in affording no point of lodgment for the accumulation of solids, in requiring no additional refrigeration, and in providing a separate supply of pure oxygen along with the output of lower purity oxygen from the main column. This supply of pure oxygen is useful for various purposes (for example, gas-cutting and welding) to which the less pure principal output is not adapted.

The invention is illustrated in the accompanying two sheets of drawings in which Fig. 1 is a diagrammatic view of a conventional combination of two-stage column with an interchanger in which the air supply is refrigerated by gaseous column products, together with a secondary fractionating column, an oxygen vaporizer and the valves and conduits by which the accessory apparatus is caused to function in cooperation with the main fractionating equipment.

Figure 2:
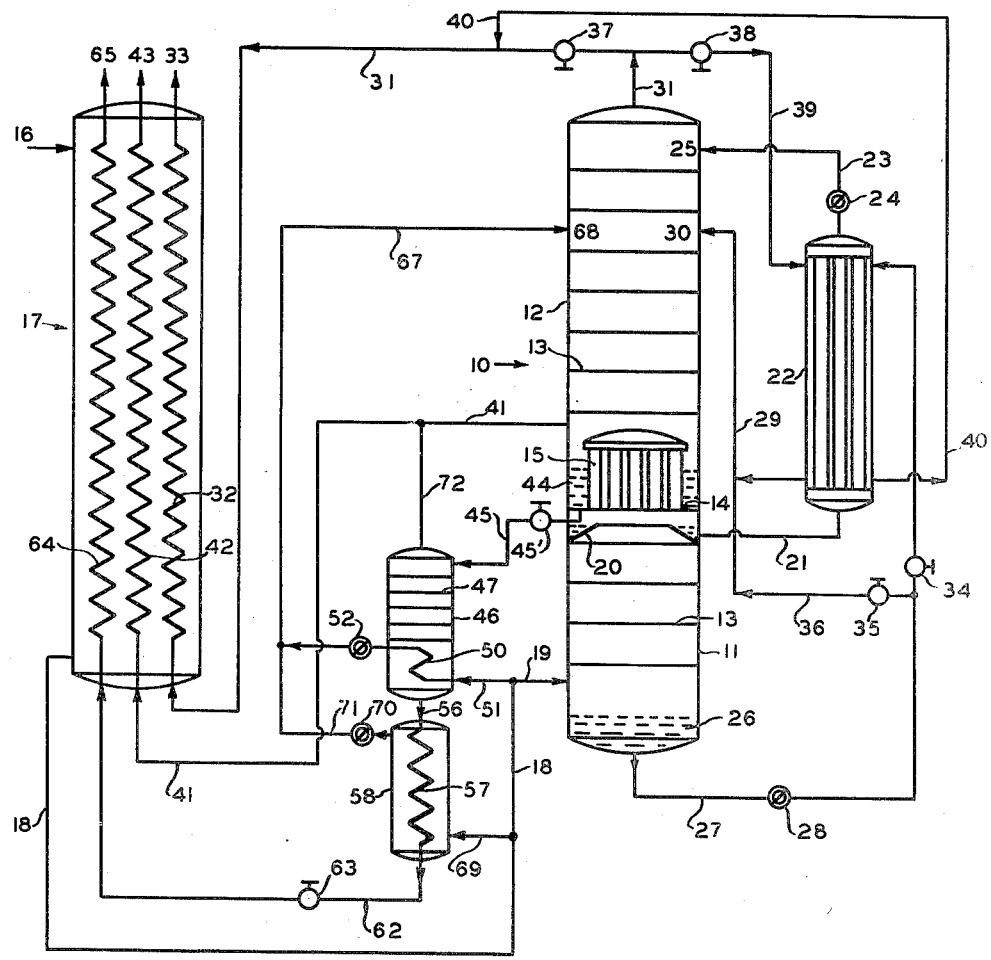

Fig. 2 is a similar diagrammatic view of another embodiment in which a different type of secondary fractionating column is employed.

Referring to Fig. 1, the main fractionating column 10 consists of a high pressure section 11 and a low pressure section 12, each section being provided with any preferred type of gas-liquid contact structure, indicated without detail at 13—13. The sections are separated by a partition plate 14 in which is mounted a refluxing condenser 15.

Air under a suitable pressure, as for example from 75 pounds gauge upwardly, enters the system at 16 and flows through a four-pass interchanger 17 in which it is refrigerated by heat interchange with cold column products. The major part of the air supply flows through conduits 18 and 19 and is introduced at approximately its temperature of incipient liquefaction into the high pressure column section.

Nitrogen vapor separating in the high pressure section is liquefied in condenser 14, a portion returning to the trays 13 as reflux for this section, and the remainder collecting in a tray 20, passing thence through conduit 21 to an interchanger 22 in which it is cooled and stabilized. The cooled liquid flows through conduit 23 and expansion valve 24 into the upper end of the low pressure section as at 25. The crude oxygen collecting in pool 26 in the base of the high pressure section passes through conduit 27 and expansion valve 28 to the opposite side of interchanger 22, in which it cools the liquid nitrogen as described, passing thence through conduit 29 to the low pressure section at a medial height, as at 30.

If preferred, the liquid nitrogen may be cooled by gaseous nitrogen. The nitrogen fractionated out in the low pressure section passes through conduit 31 to the nitrogen pass 32 of interchanger 17, in which it is brought back to substantially atmospheric temperature and pressure in refrigerating the air supply and is vented from the system at 33. If it is desired to use this product for cooling the liquid nitrogen reflux, valve 34 in conduit 27 is closed and valve 35 in bypass conduit 36 is opened to direct the crude oxygen into conduit 29, and valves 37 in conduit 31 and 38 in conduit 39 are so adjusted as to direct any required part of the gaseous nitrogen through interchanger 22, this gas returning to conduit 31 through conduit 40.

The oxygen produced by the main column is in greater part withdrawn as a vapor through conduit 41 and flows through low-purity oxygen pass 42 of interchanger 17, emerging at 43 at substantially atmospheric temperature and pressure.

A small proportion of the oxygen product, as for example from 3% to 5% of the total, is withdrawn in liquid form from the pool 44 of oxygen boiling around condenser 15. The constant ebullition of this liquid keeps the combustible solids in suspension, but as an added precaution it is desirable to effect this withdrawal from a point close to the bottom of the pool, such as conduit 45. The liquid stream passing through valve 45′ enters the secondary fractionating column 46 at a medial height. This column may be provided with any desirable gas-liquid contact structure as indicated at 47.

The upper end of the secondary column is partitioned off to provide a closed chamber 48 in which is mounted a refluxing condenser 49. The column is also provided at its lower end with a heating means, such as boiling coil 50. A small proportion of the refrigerated air passing through conduit 18 to the high pressure section is supplied to the boiling coil through conduit 51 and passes from the coil through expansion valve 52 and conduit 53 to chamber 48 in which it refrigerates condenser 49 and thus provides reflux liquid for the column. The expanded air passes through conduit 54 into the low pressure section of the main column as at 55.

If preferred, the closed chamber 48 and condenser 49 may be replaced by a coil of suitable size connecting conduits 53 and 54 and in contact with the nitrogen vapor present in the top of the column.

Oxygen substantially free of lower boiling gases is separated in liquid form in the secondary column and passes through conduit 56 into a vaporizer which may include a vaporizing coil 57 surrounded by a shell 58. A small proportion of an intermediate product of the fractionation operation such as the crude oxygen produced by the main column is passed through branch conduit 59, passes through shell 58 in which it vaporizes the liquid oxygen, and passes thence through conduit 60 and expansion valve 61 into conduit 53 in which it joins the stream of expanded air flowing toward chamber 48. The phrase "lower boiling gases" as used in this specification and the claims refer to the nitrogen and argon which are present in the lower purity oxygen product of a tonnage plant.

The vaporized pure oxygen flows from coil 57 through conduit 62 and regulating valve 63 to the pure oxygen pass 64 of interchanger 17, emerging at 65 as a gas at substantially atmospheric temperature and pressure.

By reason of the small proportion of nitrogen in the liquid oxygen fed to the secondary column, it is easy so to regulate the operation of this unit as to strip out the argon content of the oxygen. This argon gas passes off with the nitrogen vapor separated in this column, through conduit 66 to conduit 31 where it is combined with the nitrogen product from the air fractionating column and the combined stream then flows to the interchanger pass 32.

The yield of oxygen delivered at 65 contains all of the hydrocarbons carried in the air supply to the main column, but this proportion when thus continuously withdrawn is far too small to be explosive or to affect the quality of the pure oxygen. The purity of this minor oxygen yield may be of the order of 99.5% to 99.9% oxygen.

In Fig. 2 a system is shown which is similar to that shown in Fig. 1 and in which the same reference numerals refer to corresponding parts.

Referring to Fig. 2, it will be noted that the secondary stripping column 46 is in the form of a different type of fractionating column than that shown in Fig. 1. A small proportion of the oxygen product is withdrawn in liquid form from the pool 44 of oxygen boiling around condenser 15, through conduit 45 controlled by valve 45′. The liquid stream enters the secondary column 46 at a point near the top thereof. This column may be a packed column or may be provided with any desirable form of gas-liquid contact structure, as indicated at 47. The column is provided at its lower end with a heating means, such as boiling coil 50. A small proportion of the refrigerated air passing through conduit 18 to the high pressure section is supplied to the boiling coil through conduit 51 and passes from the coil through expansion valve 52 and conduit 67 into the low pressure section of the main column as at 68.

The substantially pure oxygen separating in liquid form in the secondary column passes through conduit 56 in a vaporizer which may include a vaporizing coil 57 surrounded by a shell 58. Another small portion of the refrigerated air passing through conduit 18 is supplied to shell 58 through conduit 69. This air passes from the shell through expansion valve 70 and conduit 71 to a point where it joins the expanded stream of air from boiling coil 50 and the merged stream passes through conduit 67 into the low pressure section of the main column at 68.

The vaporized pure oxygen flows from coil 57 through conduit 62 and regulating valve 63 to the pure oxygen pass 64 of interchanger 17, emerging at 65 as a gas at substantially atmospheric temperature and pressure. The vaporized mixture of oxygen, nitrogen and argon separated in the secondary column 46 passes out of the top of this column through conduit 72 to conduit 41 where it is combined with the gaseous oxygen product from the air fractionating column and the combined stream then flows to interchanger pass 42.

By drawing off slightly more liquid oxygen from pool 44 than is necessary to meet the pure oxygen requirements, in the embodiment illustrated in Fig. 2, a simple fractionation step results in the desired quantity of pure product oxygen, the oxygen vapor stripped out with the impurities being recovered and utilized in the main stream of oxygen product.

While the invention is illustrated as applied to the operation of a two-stage column, this being the form customarily used for fractionating very large volumes of air, the present invention is equally adapted to combination with the operation of a single-stage column.

The heat interchangers shown in the drawing are merely illustrative, and any suitable form of heat exchange system may be used.

Although the fluid supplied to boiling coil 50 is disclosed in the modification illustrated in Fig. 2 as being part of the feed air, it will be understood that any suitable heating medium can be utilized at this point.

I claim:

1. In an air fractionating operation in which oxygen containing lower boiling gases and traces of hydrocarbons is separated in a liquid pool from which oxygen vapor is withdrawn as a final product, the steps comprising, continuously withdrawing a liquid stream including the hydrocarbons from the bottom of the pool, the liquid stream constituting a minor portion of the total oxygen product, withdrawing the remainder of the oxygen product in gaseous form, maintaining the withdrawn liquid segregated from the withdrawn oxygen product in gaseous form, stripping the withdrawn liquid and thereby substantially freeing the residual liquid from the lower boiling gases, collecting the residual liquid in a body, continuously withdrawing a liquid stream including the hydrocarbons from the lower part of the body, and heat interchanging the liquid and the hydrocarbons against a stream of warmer fluid to vaporize the liquid and the hydrocarbons.

2. A method substantially as recited in claim 1, in which said stream of warmer fluid is a stream of refrigerated air flowing toward said air fractionating operation.

3. A method substantially as recited in claim 1, in which said stream of warmer fluid is a stream of refrigerated air flowing toward said air fractionating operation, and in which the vaporized liquid is brought substantially to atmospheric temperature by heat interchange with said air stream during the refrigeration thereof.

4. A method substantially as recited in claim 1 in which said stream of warmer fluid is a stream of intermediate product of the fractionating operation.

5. A method substantially as recited in claim 1 in which the stream of warmer fluid is a stream of crude oxygen produced as an intermediate product in the air fractionating operation.

6. In an air fractionating operation in which oxygen containing lower boiling gases and traces of hydrocarbons is separated in a liquid pool from which oxygen vapor is withdrawn as a final product, the steps comprising, continuously withdrawing a liquid stream including the hydrocarbons from the bottom of the pool, the liquid stream constituting a minor portion of the total oxygen product, withdrawing the remainder of the oxygen product in gaseous form, maintaining the withdrawing liquid segregated from the withdrawn oxygen product in gaseous form, refractionating the withdrawn liquid stream and thereby substantially freeing the residual liquid from the lower boiling gases, collecting the residual liquid in a body, continuously withdrawing a liquid stream including the hydrocarbons from the lower part of the body, and heat interchanging the liquid and the hydrocarbons against a stream of warmer fluid while flowing the liquid downwardly to vaporize the liquid and the hydrocarbons.

7. In an air fractionating operation in which gaseous nitrogen is produced as a final product and oxygen containing lower boiling gases and traces of hydrocarbons is separated in a liquid pool from which oxygen vapor is withdrawn as a second final product, the steps comprising, substantially continuously withdrawing a liquid stream including the hydrocarbons from the bottom of the pool, the liquid stream constituting a minor portion of the total oxygen product, withdrawing the remainder of the oxygen product in gaseous form, maintaining the withdrawn liquid segregated from the withdrawn oxygen product in gaseous form, fractionating the withdrawn liquid stream and thereby producing substantially pure liquid oxygen containing the hydrocarbons and a vapor rich in the lower boiling gases substantially free from the oxygen and the hydrocarbons, withdrawing and mixing the vapor with the final product gaseous nitrogen produced in the air fractionating operation, and passing the stream of the oxygen-rich liquid including the hydrocarbons downwardly while applying heat to the stream to vaporize the liquid and the hydrocarbons.

8. In an air fractionating operation in which oxygen containing lower boiling gases and traces of hydrocarbons is separated in a liquid pool from which oxygen vapor is withdrawn as a final product, the steps comprising, continuously withdrawing a liquid stream including the hydrocarbons from the bottom of the pool, the liquid stream constituting a minor portion of the total oxygen product, withdrawing the remainder of the oxygen product in gaseous form, maintaining the withdrawn liquid segregated from the withdrawn oxygen product in gaseous form, fractionating the withdrawn liquid stream and thereby substantially freeing the residual liquid from the lower boiling gases, collecting the residual liquid in a body, continuously withdrawing a liquid stream including the hydrocarbons from the lower part of the body, and heat interchanging the liquid and the hydrocarbons against a stream of warmer fluid while flowing the liquid downwardly to vaporize the liquid and the hydrocarbons.

9. In an air fractionating operation in which oxygen containing lower boiling gases and traces of hydrocarbons is separated in a liquid pool from which oxygen vapor is withdrawn as a final product, the steps comprising, substantially continuously withdrawing a liquid stream including the hydrocarbons from the bottom of the pool, the liquid stream constituting a minor portion of the total oxygen product, withdrawing the remainder of the oxygen product in gaseous form, maintaining the withdrawn liquid segregated from the withdrawn oxygen product in gaseous form, fractionating the withdrawn liquid stream and thereby producing substantially pure liquid oxygen containing the hydrocarbons and a vapor rich in the lower boiling gases substantially free from the hydrocarbons and containing appreciable oxygen, withdrawing and mixing the vapor with the final product oxygen removed in gaseous form, and passing the stream of the oxygen-rich liquid including the hydrocarbons downwardly while applying heat to the stream to vaporize the liquid and the hydrocarbons.

10. In an air fractionating operation in which oxygen containing small proportions of lower boiling gases and traces of hydrocarbons is separated in a liquid pool from which oxygen vapor is withdrawn as a final product, the steps comprising, substantially continuously withdrawing a liquid stream including the hydrocarbons from the bottom of the pool, the liquid stream constituting a minor portion of the total oxygen product, withdrawing the remainder of the oxygen product in gaseous form, maintaining the withdrawn liquid segregated from the withdrawn oxygen product in gaseous form, stripping the withdrawn liquid stream and thereby producing a liquid rich in oxygen and containing the hydrocarbons and a vapor rich in the lower boiling gases and substantially free from the hydrocarbons, withdrawing the vapor from the stripping step, and passing the stream of the oxygen-rich liquid including the hydrocarbons downwardly while applying heat to the stream to vaporize the liquid and the hydrocarbons.

11. An air fractionating operation comprising, refrigerating and liquefying a stream of compressed air containing traces of hydrocarbons which are solid at the temperature of boiling liquid oxygen, fractionating the liquefied air to produce liquid oxygen with a purity below 99% containing the solid hydrocarbons in suspension, withdrawing from 3% to 5% of the oxygen product in liquid form with the hydrocarbons in suspension, withdrawing the remainder of the oxygen product in gaseous form, stripping the withdrawn liquid to produce substantially pure liquid oxygen containing suspended solid hydrocarbons, and passing a continuous stream of this pure liquid oxygen including the hydrocarbons in heat interchange with a gas having a temperature sufficiently high to vaporize the liquid and the solid hydrocarbons suspended therein.

12. The method of producing a desired quantity of pure oxygen product as a minor product in an air fractionating system in which oxygen containing lower boiling gases is separated in a liquid pool from which oxygen-rich vapor is withdrawn in large quantities as the major product, comprising continuously withdrawing from the pool a quantity of liquid, supplying heat to the withdrawn liquid to boil off all the lower boiling gases together with the oxygen necessarily carried off in the separation of the lower boiling gases and to form a liquid residue, the amount of liquid withdrawn from the pool being such that the amount of liquid residue remaining is the desired quantity of minor product, and adding the oxygen and the lower boiling gases boiled off to the gaseous major product withdrawn from the column.

13. Air fractionating apparatus, comprising means for refrigerating a stream of compressed air, a relatively large column for fractionating the air in two pressure stages into a nitrogen-rich product and an oxygen-rich product, the column having a crude liquid oxygen reservoir in its higher pressure section, a purer liquid oxygen reservoir in its lower pressure section and an outlet for gaseous nitrogen from the lower pressure section, a relatively small fractionating column having a passage means in its upper end with a surface exposed to the interior of the small column and a heating means in its lower end, a vaporizer arranged to drain liquid from the lower end of the small column, means for transferring a liquid stream from the bottom of the purer oxygen reservoir into the smaller column, means for passing a stream of liquid from the crude oxygen reservoir to the vaporizer for heating and vaporizing the liquid flowing therein, means for passing a stream of the compressed refrigerated air through the heating means, means for expanding at least one of the last two streams to substantially the pressure maintained in the lower pressure section of the larger column, means for passing the expanded stream to the passage means to provide reflux liquid for the smaller column, and means for passing the expanded stream from the passage means into the lower pressure section of the larger column.

14. Apparatus substantially as recited in claim 13 in which means are provided for withdrawing a gaseous stream relatively poor in oxygen from the upper end of the smaller column, and means for mixing the gaseous stream with the final product gaseous nitrogen flowing from the large column.

15. Air fractionating apparatus comprising, an air fractionating column in which an oxygen product in liquid form is produced, a smaller fractionation column having a heating means in its lower end, means for conducting a stream of liquid oxygen from the air fractionating column into the smaller column, means for vaporizing liquid material collecting in the smaller column comprising a vaporizer substantially vertically arranged and draining the smaller column, means for passing relatively warm compressed fluids to the vaporizer and through the said heating means, means for expanding at least one of the fluids, and means for passing the expanded fluids to the air fractionating column.

16. Air fractionating apparatus comprising, means for refrigerating a stream of compressed air, a relatively large column for fractionating the air in two pressure stages, the column having a liquid oxygen reservoir in the low pressure section from which oxygen vapor is withdrawn as a final product, a relatively small fractionating column having a heating means in its lower end, a vaporizer arranged to drain liquid from the bottom of the small column, means for transferring a liquid stream from the bottom of the oxygen reservoir into the upper portion of the fractionating column, means for passing a stream of the compressed refrigerated air to the vaporizer for heating and vaporizing the liquid flowing therein, means for passing a stream of the compressed refrigerated air through the heating means, means for expanding at least one of the last two streams to substantially the pressure maintained in the low pressure section of the larger column, and means for passing the expanded fluids to the lower pressure section of the larger column.

17. Air fractionating apparatus comprising heat exchanger means for cooling the air to be fractionated, an air fractionating column in which oxygen containing lower boiling gases and traces of hydrocarbons is separated in a liquid pool from which oxygen vapor is withdrawn as a final product, means for continuously withdrawing a liquid stream from the bottom of the liquid pool, means for withdrawing the remainder of the oxygen product from the column in gaseous form, means for passing the withdrawn gaseous product to the heat exchanger means, a stripping column for stripping the withdrawn liquid and thereby substantially freeing it from the lower boiling gases, a vaporizer, means for continuously passing a liquid stream including the hydrocarbons from the bottom of the stripping column to the vaporizer, means for conducting a stream of warmer fluid to the vaporizer for heating the liquid stream therein to vaporize the liquid, and means for withdrawing the vaporized stream from the vaporizer.

18. Air fractionating apparatus comprising, means for refrigerating a stream of compressed air, a relatively large column for fractionating the air in two pressure stages, the column having a liquid oxygen reservoir in the low pressure section from which oxygen vapor is withdrawn as a final product, a relatively small fractionating column having a heating means in its lower end, a vaporizer arranged to drain liquid from the bottom of the small column, means for transferring a liquid stream from the bottom of the oxygen reservoir into the upper portion of the fractionating column, means for passing a stream of the compressed refrigerated air to the vaporizer for heating and vaporizing the liquid flowing therein, means for passing a stream of the compressed refrigerated air through the heating means, means for expanding at least one of the last two streams to substantially the pressure maintained in the low pressure section of the larger column, means for passing the expanded fluids to the lower pressure section of the larger column, means for withdrawing a gaseous stream from the upper end of the smaller column, and means for mixing the gaseous stream withdrawn from the upper end of the smaller column with the oxygen vapor withdrawn as a final product from the large column.

References Cited in the file of this patent

UNITED STATES PATENTS

| Number | Name | Date |
|---|---|---|
| 1,211,125 | Fonda | Jan. 2, 1917 |
| 1,426,461 | Claude | Aug. 22, 1922 |
| 1,498,766 | Van Nuys | June 24, 1924 |
| 1,976,336 | Eichelman | Oct. 9, 1934 |
| 1,976,388 | Eichelman | Oct. 9, 1934 |
| 2,051,576 | Schlitt | Aug. 18, 1936 |
| 2,360,468 | Brown | Oct. 17, 1944 |
| 2,423,274 | Van Nuys | July 1, 1947 |
| 2,433,536 | Van Nuys | Dec. 30, 1947 |
| 2,503,939 | De Baufre | Apr. 11, 1950 |
| 2,513,306 | Garbo | July 4, 1950 |
| 2,619,810 | Rice | Dec. 2, 1952 |
| 2,650,482 | Lobo | Sept. 1, 1953 |